United States Patent
Spiess

(10) Patent No.: US 8,177,173 B2
(45) Date of Patent: May 15, 2012

(54) FIXING RAIL FOR AN ELONGATE OBJECT

(75) Inventor: Hagen Spiess, Hamburg (DE)

(73) Assignee: Hellerman Tyton GmbH, Tornesch (DE)

( * ) Notice: Subject to any disclaimer, the term of this patent is extended or adjusted under 35 U.S.C. 154(b) by 944 days.

(21) Appl. No.: 12/084,415

(22) PCT Filed: Nov. 3, 2006

(86) PCT No.: PCT/EP2006/010572
§ 371 (c)(1),
(2), (4) Date: Apr. 30, 2008

(87) PCT Pub. No.: WO2007/051639
PCT Pub. Date: May 10, 2007

(65) Prior Publication Data
US 2009/0172930 A1   Jul. 9, 2009

(30) Foreign Application Priority Data

Nov. 3, 2005   (DE) ..................... 20 2005 017 160 U

(51) Int. Cl.
*H02G 3/32* (2006.01)

(52) U.S. Cl. ............. 248/71; 24/16 R; 248/73; 248/74.1

(58) Field of Classification Search ................. 248/68.1, 248/73, 71, 74.1, 74.3; 24/16 R, 16 PB
See application file for complete search history.

(56) References Cited

U.S. PATENT DOCUMENTS 3,802,654 A    4/1974  Jenko et al.
6,076,781 A *  6/2000  Kraus ............................ 248/73

FOREIGN PATENT DOCUMENTS

CA    2 359 714 A1   4/2003
EP    0 967 702 A2   12/1999

\* cited by examiner

*Primary Examiner* — James Brittain
(74) *Attorney, Agent, or Firm* — Alix, Yale & Ristas, LLP

(57) ABSTRACT

A rail which can be bound, by means of a strap, to an elongate object, in particular a cable harness or a line, and has a bearing surface, which is intended to rest against the object, and a binding surface, which is directed away from the bearing surface and accommodates the strap. The binding surface has a plurality of protrusions which are compliant in the direction transverse to this surface. A strap arranged at any desired location of the binding surface is positioned transversely over one or more protrusions, in which case these protrusions are pressed down. Adjacent protrusions which have not been pressed down are located on one side and/or the other, and these resist the lateral displacement of the strap.

14 Claims, 1 Drawing Sheet

FIXING RAIL FOR AN ELONGATE OBJECT

BACKGROUND

The invention relates to a rail which can be bound, by means of a strap, to an elongate object, in particular a cable harness or a line, and has a bearing surface, which is intended to rest against the object, and a binding surface, which is directed away from the bearing surface and accommodates the strap.

For the purpose of fixing cable harnesses, lines or other elongate objects on a carrying structure, it is known to use rails which, on the one hand, are designed for connection to the elongate object and, on the other hand, have a means for fixing on the carrying structure. They are elongate and, in the direction facing the elongate object, have a bearing surface against which this object can rest. For the purpose of better force transmission, the bearing surface may be adapted to the shape of the elongate object. The rail is bound to the elongate object. For this purpose, use is usually made of cross-sectionally flat straps, in particular straps made of plastics material, these being commercially available in the form of so-called cable straps. The straps wrap around the elongate object and the rail with a predetermined level of tensioning, that surface of the rail which is directed away from the object being subjected to a binding force by the straps. This surface is therefore referred to, in the present context, as a binding surface. In order to provide sufficient support for the object which is to be bound, the rail has a length which is considerably greater than the width of a strap used for binding purposes. In the case of known rails (FR-A-2861157), this has the disadvantage that the rail is positioned in an unreliable manner in relation to the strap because the strap can slip along the rail. In order to increase the fastening reliability, it has been proposed to provide, on the underside of the rail, latching teeth which are designed for engaging in the strap of the cable binder (DE-A-19704674). However, since the strap of the cable binder, for reasons relating to a high retaining force, usually consists of tough material, the latching teeth cannot penetrate to a sufficient extent or break off under the action of excessive force. In order to avoid this risk, it has further been proposed to replace the latching teeth by a web-like protrusion on the underside, a corresponding longitudinal slot being formed in the strap of the cable binder, in which case the protrusion can engage therein. This means, however, that the strap is positioned rigidly in relation to the rail, in which case installation can take place only in precisely one position. This makes handling more difficult or it is necessary to have high-outlay cable binders which are integrally formed specially in captive fashion on the rail (DE-A-19843633). The former case involves high outlay in respect of installation, and the second variant mentioned involves high outlay in respect of production.

An object is to provide an improved rail which, allowing for easy installation, reliably retains the strap on the rail.

SUMMARY

In the case of a cable binder of the type mentioned in the introduction, the binding surface is provided with a plurality of protrusions which are compliant in the direction transverse to this surface. The row of these protrusions is longer than the width of the strap. A strap arranged at any desired location of the binding surface is positioned over one or more protrusions. Since the latter are compliant in the direction transverse to the extent of the binding surface, they are pressed down. Also present on one side and/or the other are closely adjacent protrusions which have not been pressed down, and are thus at more or less the same level as the strap itself. These protrusions are thus capable of resisting the lateral displacement of the strap. In order for this resistance to be sufficiently high, the resistance of the protrusions in relation to forces which are acting in the longitudinal direction of the rail should be sufficiently high in comparison with the presupposed displacement forces, and in any case higher than the force which is necessary for deforming these protrusions in the direction transverse to the binding surface. This property is referred to by the word stiff.

The level of compliance of the protrusions in the direction transverse to the extent of the binding surface is high enough when they are pressed down to a greater or lesser extent by a strap which is tensioned by a presupposed minimum binding force, in which case the adjacent protrusions remain standing at a higher level. A preferred embodiment is one in which the level of compliance of the protrusions is high enough, or the resistance of the latter to deformation in the direction transverse to the binding surface is low enough, for them to be pressed all the way down when the minimum binding force is applied, since the strap can then be supported on a quasi-rigid surface and the binding reliability is not impaired by it still being possible for the protrusions to be compliant to a greater or lesser extent.

The protrusions may be plastically or elastically compliant. The plastic materials which are usually used for such articles (for example polyamide) allow for both eventualities.

In order that relative displacement between the rail and the object which is to be bound is also prevented as far as possible, the bearing surface may be provided with frictional protrusions. These are protrusions which, when subjected to the binding force, give rise to a frictional force which counteracts the displacement. These frictional protrusions are expediently designed as ribs which run transversely to the longitudinal direction of the bearing surface.

BRIEF DESCRIPTION OF THE DRAWINGS

The invention will be explained in more detail hereinbelow with reference to the drawing, which depicts an advantageous exemplary embodiment and in which.

DETAILED DESCRIPTION

Figure 1:
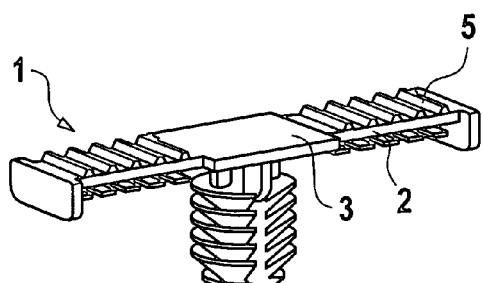
FIG. 1 shows a perspective view of the bearing surface.

The rail 1 is formed predominantly by a plate 2, of which the surface which appears at the top in FIG. 1 forms the bearing surface 3 for bearing the object 4 which is to be bound. This surface carries transverse ribs 5 which are intended to counteract longitudinal displacement of the object 4 relative to the rail. This surface is illustrated as being essentially planar. It may be adapted in a non-planar manner to the shape of the object which is to be bound. If the object has a cylindrical cross-sectional shape, the bearing surface 3 may be grooved correspondingly, for example, in cross section.

Figure 2:
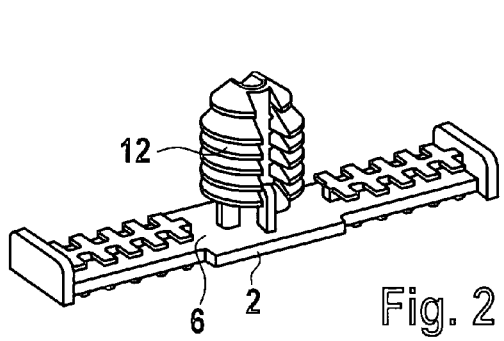
FIG. 2 shows a perspective view of the binding surface.
Figure 3:
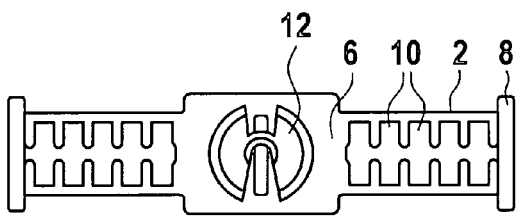
FIG. 3 shows a plan view of the binding surface.
Figure 5:
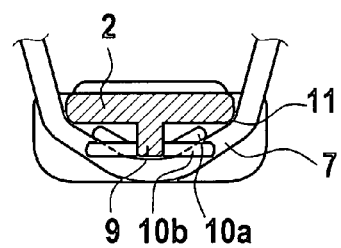
FIG. 5 shows, on a larger scale, a section along line V-V with a strap.
Figure 4:
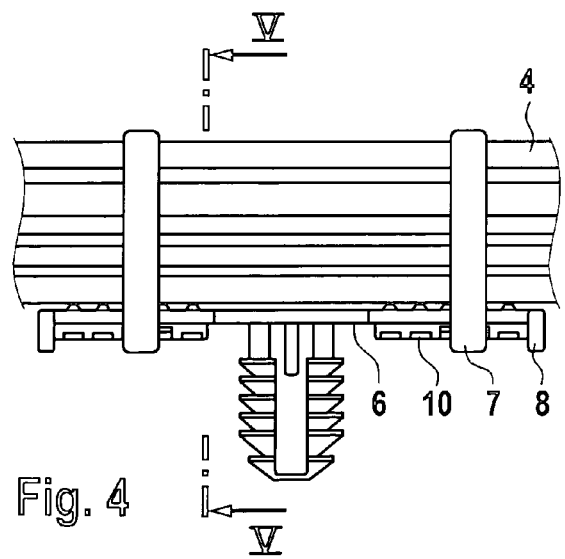
FIG. 4 shows a side view.

The binding surface 6 of the plate 2, this surface appearing at the bottom in FIG. 1 and at the top in FIG. 2, serves for accommodating at least one tensioning strap 7. The length of the binding surface, and the symmetrical design with two wings, are preferably such as to allow two tensioning straps 7 to be provided. These straps are of the conventional type and therefore require no explanation here. Their width is a number of times smaller than the length of the binding surface 6 and/or than the length of each wing of the binding surface 6.

The binding surface 6 has, at the ends, thickened portions 8 which ensure that, in the case of extreme displacement forces, it is not possible for the straps 7 to slide over the end of the rail. It is usually the case, however, that such displacement is already prevented by the protrusions which have been mentioned above, and will now be described in more detail.

Figure 6:
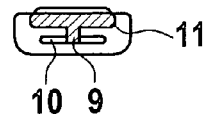
FIG. 6 shows the same section without a strap.

Running along the center of the binding surface 6 is a longitudinal rib 9 on which is arranged at least on one side, but preferably on both sides, over the entire length of the binding surface, a row of tongue-like protrusions 10. These are spaced apart from the binding surface 6. They project over the connecting line between the associated side edge 11 of the binding surface 6 and the crest of the rib 9. Since the strap more or less follows this connecting line and is subjected to tensioning (see FIG. 6), a protrusion 10a, which is located beneath the strap 7, is pressed down. The protrusions 10b, which are located alongside the strap 7, maintain their original position and thus project in relation to this strap; they are located alongside it. Should the strap 7 exhibit a tendency to be displaced in the longitudinal direction of the rail 1, then it strikes against the next adjacent protrusion 10b and is secured by the same.

In order for the resistance by which the protrusions 10 counteract this displacement to be as high as possible, but for the forces by which the protrusions are deformed by the strap 7 tensioned over the same to be as low as possible, the protrusions are designed as flat tongues with a small dimension (thickness) in a transverse plane (parallel to section plane V-V) and transverse to the direction in which the strap runs, and with a significant dimension (width) in the longitudinal direction of the rail. The thickness is less than half the width. This means that the section modulus of the protrusions in relation to being bent by the strap tensioned over the same is smaller than an eighth of the section modulus of the protrusions in relation to forces to which they are subjected in the longitudinal direction of the rail. The thickness is preferably approximately a third or a quarter of the width. The length should be at least equal to the width.

In the example illustrated, in the state in which they are relieved of tensioning, the protrusions 10 run in a direction approximately parallel to the plate 2. Their direction deviates only slightly from the direction of the tensioned strap 7. Their level of deformation and the level of force which has to be applied for this purpose are thus low. This form is advantageous, but may also be different. For example, it is possible for the protrusions 10 to be inclined to a greater extent in relation to the plate 2, and/or to the direction of the strap, and to be correspondingly shorter. In the case of a further alternative embodiment, instead of the rib 9, a row of protrusions projects vertically from the plate 2. As in the example illustrated, they are likewise designed as flat tongues. They are bent or angled to one side or the other by the strap tensioned over them. The protrusions remaining alongside the strap remain standing and provide for resistance to displacement.

The object which is to be bound is connected to a carrying structure, or to some other object, by the rail. For this purpose, the rail is provided with a fixing means which, in the example illustrated, is designed as a so-called fir-tree foot 12, which is intended to be forced into a retaining bore. Any other desired fixing means may be provided instead.

The rail is expediently produced in one piece from plastics material, for example polyamide.

The invention claimed is:

1. A rail having a longitudinal direction and which can be bound, by means of a strap, to an elongate object, and has a bearing surface, which is intended to rest against the object, and a binding surface, which is directed away from the bearing surface and accommodates the strap, characterized in that the binding surface has a plurality of protrusions with a flat tongue design, said protrusions being stiff in relations to forces acting parallel to the longitudinal direction of the rail and compliant in the direction transverse to said longitudinal direction, and said stiffness in relation to forces acting in the longitudinal direction of the rail is higher than the force which is necessary to deform the protrusions in the direction transverse to the binding surface.

2. The rail as claimed in claim 1, characterized in that the thickness of the protrusions is no greater than half the width of the protrusions.

3. The rail as claimed in claim 2, characterized in that the binding surface is provided with a thickened end portion.

4. The rail as claimed in claim 3, characterized in that the bearing surface carries frictional protrusions.

5. The rail as claimed in claim 2, characterized in that the bearing surface carries frictional protrusions.

6. The rail as claimed in claim 5, characterized in that the frictional protrusions are transverse ribs.

7. The rail as claimed in claim 5, characterized in that it is provided with a fixing means for connection to a carrying structure.

8. The rail as claimed in claim 2, characterized in that it is provided with a fixing means for connection to a carrying structure.

9. The rail as claimed in claim 1, characterized in that it is provided with a fixing means for connection to a carrying structure.

10. The rail as claimed in claim 1, characterized in that the binding surface is provided with a thickened end portion.

11. The rail as claimed in claim 10, characterized in that the bearing surface carries frictional protrusions.

12. The rail as claimed in claim 1, characterized in that the bearing surface carries frictional protrusions.

13. The rail as claimed in claim 12, characterized in that the frictional protrusions are transverse ribs.

14. The rail as claimed in claim 12, characterized in that it is provided with a fixing means for connection to a carrying structure.

* * * * *

UNITED STATES PATENT AND TRADEMARK OFFICE
CERTIFICATE OF CORRECTION

| | | |
|---|---|---|
| PATENT NO. | : 8,177,173 B2 | |
| APPLICATION NO. | : 12/084415 | |
| DATED | : May 15, 2012 | |
| INVENTOR(S) | : Hagen Spiess | |

It is certified that error appears in the above-identified patent and that said Letters Patent is hereby corrected as shown below:

Title Page
Item (73): Assignee [error in the spelling of the Assignee's name]

delete "Hellerman Tyton GmbH, Tornesch (DE)" and insert
--Hellermann Tyton GmbH, Tornesch (DE)--.

Signed and Sealed this
Seventh Day of August, 2012

David J. Kappos
*Director of the United States Patent and Trademark Office*